US010572916B2

(12) United States Patent
Deshmukh et al.

(10) Patent No.: US 10,572,916 B2
(45) Date of Patent: Feb. 25, 2020

(54) REAL-TIME EXPENDITURE AND TRANSACTION MANAGEMENT

(71) Applicant: International Business Machines Corporation, Armonk, NY (US)

(72) Inventors: Abhijit Deshmukh, Pune (IN); Anurag Srivastava, Pune (IN)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 13/664,249

(22) Filed: Oct. 30, 2012

(65) Prior Publication Data

US 2014/0122335 A1 May 1, 2014

(51) Int. Cl.
*G06Q 30/06* (2012.01)
(52) U.S. Cl.
CPC ................................... *G06Q 30/06* (2013.01)
(58) Field of Classification Search
CPC ...................................................... G06Q 30/06
USPC ............................................................ 705/75
See application file for complete search history.

(56) References Cited

U.S. PATENT DOCUMENTS

| 8,417,584 | B2* | 4/2013 | Ross | G06Q 40/00 705/26.1 |
| 2003/0105711 | A1* | 6/2003 | O'Neil | G06Q 20/10 705/39 |
| 2003/0208439 | A1* | 11/2003 | Rast | G06Q 20/04 705/38 |
| 2004/0039694 | A1* | 2/2004 | Dunn | G06Q 20/04 705/39 |
| 2004/0177030 | A1* | 9/2004 | Shoham | 705/38 |
| 2005/0288954 | A1* | 12/2005 | McCarthy | A61B 5/6815 705/2 |
| 2007/0022058 | A1* | 1/2007 | Labrou et al. | 705/67 |
| 2007/0192245 | A1* | 8/2007 | Fisher et al. | 705/39 |
| 2008/0249793 | A1* | 10/2008 | Angell | G06Q 30/02 705/1.1 |
| 2009/0006188 | A1* | 1/2009 | Guo et al. | 705/14 |
| 2009/0270743 | A1* | 10/2009 | Dugan | A61B 5/0002 600/500 |
| 2010/0010935 | A1* | 1/2010 | Shelton | 705/36 R |
| 2010/0205541 | A1* | 8/2010 | Rapaport et al. | 715/753 |
| 2011/0202474 | A1* | 8/2011 | Mele et al. | 705/36 R |

(Continued)

OTHER PUBLICATIONS

Vollbrecht, John, et al. AAA authorization framework. No. RFC 2904. 2000.*

(Continued)

*Primary Examiner* — Jacob C. Coppola
(74) *Attorney, Agent, or Firm* — Stephen R. Yoder

(57) ABSTRACT

Machines, process, and articles of manufacture are provided wherein evaluations of a subscriber transaction or expenditure are provided. This evaluation may include receiving and considering one or more measured real-time first metrics of the subscriber, evaluating one or more received first metrics of the subscriber, receiving two or more financial metrics, one related to the transaction or the expenditure, and one related to the subscriber, and determining whether the subscriber transaction or expenditure should be assigned a full or partial authorized status. In an embodiment, the subscriber or a proxy may override a returned authorization to proceed with the subscriber transaction, a returned rejection, or returned advice.

15 Claims, 4 Drawing Sheets

(56) References Cited

U.S. PATENT DOCUMENTS

| | | | | |
|---|---|---|---|---|
| 2011/0208013 A1* | 8/2011 | Phan | ............... | A61B 5/002 600/301 |
| 2012/0030064 A1* | 2/2012 | Flinn | ............... | G06Q 10/06 705/26.7 |
| 2012/0116186 A1* | 5/2012 | Shrivastav | ........... | A61B 5/0507 600/301 |
| 2014/0074688 A1* | 3/2014 | Shvarts | ............... | G06Q 40/02 705/38 |

OTHER PUBLICATIONS

Smart Spending: A New Approach That Can Help You Optimize Your Procurement Spend; IBM Global Technology Services Managed Business Process Services; Jan. 2010; (c) Copyright IBM Corporation 2010; IBM Corporation, New Orchard Road, Armonk, NY 10504, USA; URL:http://www-935.ibm.com/services/au/en/attachments/pdf/Smart_Spending_Procurement.pdf.

Cisco; Private Cloud Computing for Enterprises: Meet the Demands of High Utilization and Rapid Change; URL:http://www.cisco.com/en/US/solutions/collateral/ns340/ns517/ns224/ns836/ns976/white_paper_c11-543729.html; Jun. 2009; (c) 2009 Cisco Systems, Inc.; CISCO Americas Headquarters, Cisco Systems, Inc., San Jose, CA.

Panda Cloud Protection; URL: http://cloudprotection.pandasecurity.com/files/CLOUDPROTECTION-ENG-I-BENEFITS.pdf.

Russ Klein, Omer Minkara—Aberdeen Group-A Harte-Hanks Company—Hidden Financial Benefits of The Cloud; Dec. 2011; (c) 2011 Aberdeen Group. www.aberdeen.com; http://www.ciosummitna.com/media/whitepapers/Aberdeen_WP_Hidden_Financial_Benefits_of_the_Cloud.pdf.

Sarah Perez, Banking 2.0: Money Management Moves to The Cloud, http://www.readwriteweb.com/archives/banking_20_money_management_in_the_cloud.php; Sep. 17, 2008.

* cited by examiner

REAL-TIME EXPENDITURE AND TRANSACTION MANAGEMENT

BACKGROUND

The present invention relates to management of personal finance and more specifically to real-time evaluation of personal expenditures and transactions, and the individual supervision of these expenditures and transactions.

The appropriateness of certain personal expenditures and transactions can depend on many variables and circumstances. These variables and circumstances can include the timing of the expenditure or transaction itself, the gross value of the transaction or expenditure and its relation to net worth of an individual, cash on hand of an individual, salary of an individual, liquidity of the individual, and the emotional state of the individual at the time of the expenditure or transaction. In certain instances, inappropriate transactions or expenditures may be initiated by an individual because of fleeting stresses or triggers, or because of other environmental considerations relevant to the individual. These inappropriate transactions and expenditures can be detrimental to an individual and may lead to unwanted, and sometimes unforeseen, financial hardships and consequences.

BRIEF SUMMARY

Embodiments can include methods, systems, and articles of manufacture directed to prevention of unplanned, unnecessary or incorrect personal expenditures or transactions that may be inconsistent with the planned financial goals of an individual. Embodiments can provide a bulwark or protection mechanism to safeguard against unwanted or inappropriate personal transactions and expenditures.

In embodiments, prior to completion of a personal transaction or expenditure, certain real-time metrics and purchase transaction metrics may be evaluated to determine if an individual should be allowed to finalize a pending expense or transaction. The evaluation may determine whether the expense or transaction is appropriate or inappropriate and whether it should progress further or not be finalized. In some embodiments, an evaluator, available over a network, may override or authorize an unfinished transaction or expense that does not satisfy identified thresholds determined by a service performing an initial review. This override authorization may be granted because a second evaluation of the transaction or expense, and metrics associated thereto, indicate that an aberration has occurred, perhaps that too much weight was afforded a measured metric, or that another factor outweighs the initial evaluation, and thus, the transaction or expense is deemed appropriate and within suitable tolerances under the circumstances.

The metrics, which may be identified, measured, stored, evaluated, and compared to thresholds and ranges of tolerance, may include real-time metrics of a subscriber and a transaction, as well as historical, stored metrics regarding the subscriber. Metrics particular to the entity promoting or sponsoring the transaction may be evaluated and stored as well. In embodiments, the real-time metrics can include a consumer's real-time physical and emotional attributes at the time authorization is sought; those same or similar trends or measurables regarding the subscriber before the transaction or expense; the use of macro-economic data, such as a consumer's current financial information and status; and the consumer's enumerated financial goals, as previously declared to a service or determined by a service.

Embodiments can also link with or support financial transaction authorizations. This can include interfaces with credit card and debit card networks, check and other banking service networks, financial intermediaries and other over network transaction authorizations and payment providers. Embodiments may also be compatible with and support mobile and NFC (Near Field Communication) payment capabilities.

In embodiments, during a transaction, prior to completion, a subscriber, likely a subscriber to a pre-authorization or verification service, will need to receive clearance from the service before a transaction or expense can be finalized and transacted. This clearance may require receiving real-time data regarding the physiology of a subscriber, declared financial goals or targets of the subscriber, real-time financial status or one or more accounts or assets of the subscriber, and making a determination using some or all of these inputs, or other inputs, as to whether or not clearance and approval for the transaction, before finalizing the transaction or expenditure of the subscriber. If clearance is not received, an appeal or second review may be conducted by an evaluator and a clearance may be awarded or a second rejection may occur. In so doing, irresponsible or rash expenditures and transactions can be warded off in embodiments and previously set financial goals or targets may be more easily met, or progress towards these goals or targets may continue.

DETAILED DESCRIPTION

Figure 1:
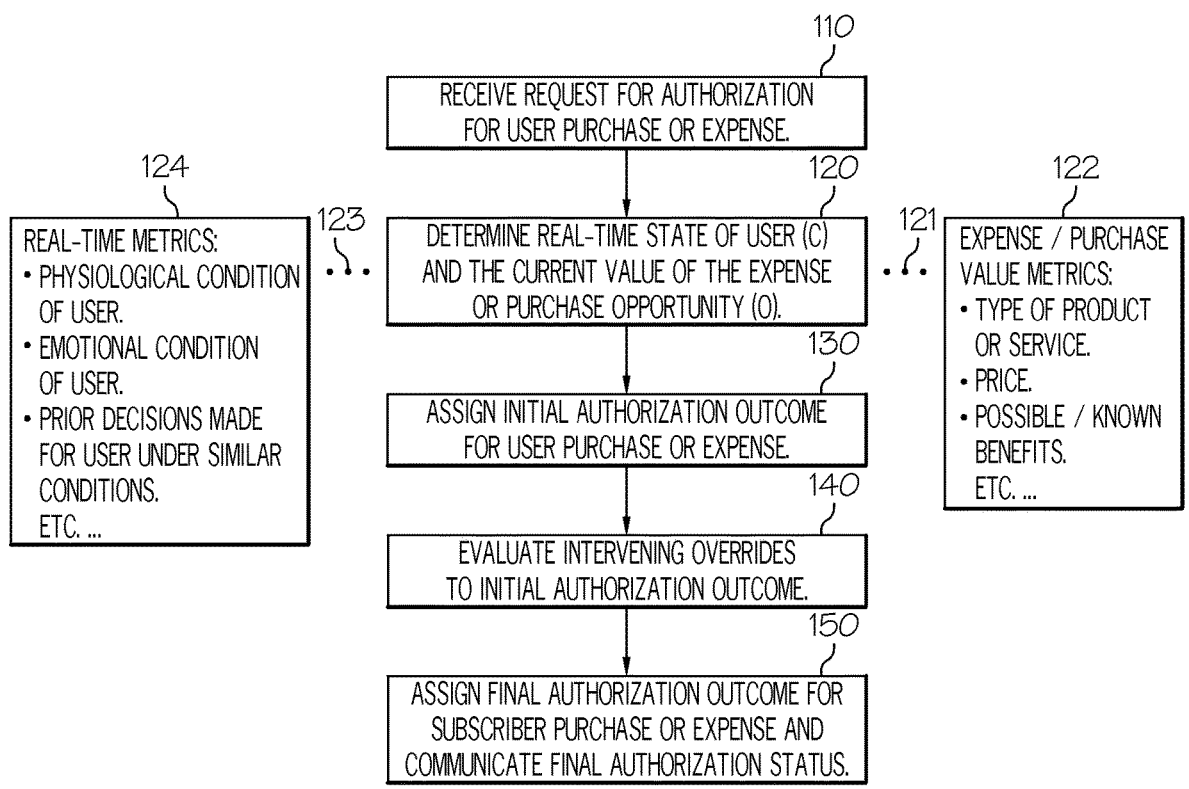
FIG. 1 shows a process of real-time regulation of personal expenditures and transactions, as may be employed in embodiments.

Methods, processes, devices, systems, and articles of manufacture are provided for and may comprise embodiments and features of the invention. In certain embodiments a cloud service evaluator may be accessed and used to determine whether a pending or proposed personal transaction or expenditure meets threshold determinations for a subscriber. Ahead of seeking to finalize the expenditure or transaction a subscriber may subscribe to a cloud service and may provide access to financial information and accounts associated with the subscriber, as well as target thresholds and goals of the subscriber. The evaluator, such as a cloud service evaluator, may consider some or all of these financial metrics as well as physiological metrics of the subscriber and may then render a determination as to whether or not the transaction or expenditure should continue towards finalization.

In embodiments a determination of an evaluator, whether a cloud service evaluator or otherwise, may be reconsidered in order to consider additional, more current and other types of metrics. Embodiments, thus, can consider and weight real-time circumstances and previously set targets and goals to evaluate and determine if a transaction or expenditure of a subscriber, likely a subscriber, falls within a prescribed range and may be considered reasonable or falls outside of prescribed range and may be seen as inadvisable.

In embodiments, even if certain financial targets or thresholds are met, if physiological metrics are high or outside of prescribed normals, the transaction or expenditure may be denied even when financial thresholds and targets are not exceeded. Here, impulse buys or other transactions may be prevented by an evaluator identifying that a physiological threshold has been exceeded and by rejecting or delaying a requested authorization. The evaluator may maintain this rejection until normals for the measured real-time physiological metrics return.

In embodiments, this evaluator may be available as a service over a network where subscribers may grant access to financial accounts and physiological monitors providing real-time metrics of the subscriber when the subscriber is seeking authorization of a transaction or expenditure. When such authorizations are sought, ahead of finalizing a transaction, the evaluator may be queried for authorization. This query may include transmittal of certain physiological metrics of the subscriber or proxy. The transmittal may be from a requestor and may be from another source, such as a remote database server available over a network. The evaluator may consider the received metrics, may query for other metrics, including financial and physiological metrics, and may return an authorization to proceed with the transaction, a rejection, or an advice, which may be overridden by the proxy or subscriber.

Evaluators, including cloud service evaluators, may be available over wide area networks, virtual networks, virtual private networks, and other network types, may also provide alternatives to expenditure and transaction decisions in real time. In so doing, a subscriber or other subscriber's real-time physical and emotional attributes may be considered. Evaluation analysis may also consider or use macro-economic data, a subscriber's current financial information/status, and a subscriber's financial goals as previously disclosed to the service.

In embodiments, authorizations to finalize a transaction or expenditure using a credit card or debit card, ACH authorization, and by using mobile NFC (Near Field Communication) payment methodologies, may be delayed or held until a clearance is received by a second evaluator (or appeal evaluator) to proceed.

Embodiments may include a smart financial service that may be available on the world-wide-web or other network that subscribers can subscribe to. These subscribers may provide sensitive personal information to this service including age, gender, bank account details, access to bank accounts, investment account details, credit card statements, IRA funds, Mutual funds, Provident Funds, etc. In preferred embodiments, the evaluator, including a cloud service, will be secure and support applicable privacy regulations, and, in particular will not make any payments or execute any financial transactions. Still further, a service term, service contract, and subscriber support may also be provided.

Ahead of or upon receiving a request for evaluation of an authorization the evaluator or related support service may: (a) monitor the subscriber's available money in the bank, available investment accounts, types of investments, available tax deferred accounts, and available provident funds, etc.; (b) monitor current liabilities including short term, medium term and long term liabilities, which may cumulatively include current credit card balances, mortgage payments, personal loans, car loans, education loans, etc.; (c) monitor market conditions and macroeconomic metrics, like rate of inflation, retail bank and T-Bill interest rates, stock market fluctuation include VIX, future interest, equity index expectations and inflation rate expectations; (d) keep track of consumer's spending history and pattern—including spending categories (apparels, books, entertainment, etc); (e) analyze whether subscriber's current spending will help the subscriber meet his or her future identified financial goals, planned expenses and emergency expenses; and track subscriber's planned minimum, absolute basic expenses, including mortgage payments, health care insurance, school fees, office-home transportation expenses, weekly groceries, etc.

Using these or other metrics, when a request for authorization for a personal transaction or expense is received at an evaluator, may authorize or deny or suggest alternatives to an expenditure or transaction. The status of the evaluator's response may serve to block or allow access for the actual financial transaction to proceed. In other words, an automated control may serve to manage a subscriber's access to his or her own finances, e.g., bank accounts, debit cards, credit cards, stocks, CDs, mobile payments, etc., in order to provide assistance to help meet their short term, medium term, and long term financial goals.

In embodiments, the evaluator may also optionally use other real-time metrics like body temperature, identified palpitations, heart rate, pupil dilation, etc., via a smart phone, wrist sensor, chest sensor, or by some other available means, to understand a subscriber's physical and emotional condition at the time of executing the transaction or expenditure.

In embodiments, an evaluator can choose to (a) completely deny a requested credit card or mobile payment or (b) authorize a percentage of the expenditure or transaction, (c) suggest/recommend another buying/spending opportunity in a different store, location or category (e.g., purchase a burger instead of an expensive smart phone).

For example, a complete denial may be overridden by other pre-defined interventions. In other words, if a spouse is depressed, as identified via a personal sensor, and attempts are made to buy a necessary good or service for a child or the home, the evaluator may deny this spend, since the spouse appears to be depressed according to sensory feedback. In such a case, the partner could use his or her cell phone to send an SMS to the cloud service evaluator to override this spend denial.

Credit card or debit card intermediaries may act to support this cloud evaluator service by making an authorization call to the spouse before proceeding with their own authorization. Embodiments may also include NFC payment communications and capabilities.

The physiological sensors may measure or track various physiological traits. These can include and are not limited to pupil dilation, eye blink rate, BMR (Basal Metabolic rate), heart beat rate, facial expressions, perspiration (intensity and rate), body temperature, hypo (or hyper) glycemic levels (indicated by blood analysis). These physiological metrics can be further evaluated with statistics or inputs that consider age, gender, weight, and height. Still further, some or more of these metrics and statistics may be used as inputs to a probabilistic and statistical model that can generate real-time offers (discounts, schemes) in the context of the subscriber's location and nearby retail outlets.

The sensors can include commercially available devices like Tanita's BC-1500 (http://www.tanita.com/en/bc-1500/)

Ironman Radio Wireless Segmental Body Composition Monitor, which can provide complete body composition profile, including weight, body fat % (total and segmental), body water %, muscle mass (total and segmental), physique rating, BMR, DCI, metabolic age, bone mass, and visceral fat. 5.

In embodiments, alternatives to an expenditure or transaction may also be suggested, including real-time suggestions. These suggestions may be based on considerations of metrics that include a subscriber's real-time physical and emotional attributes and may be relayed back to the subscriber or the point of sale terminal that made the request or both.

FIG. 1 provides a process of real-time regulation of personal expenditures and transactions, as may be executed on a processor or carried out by a system or stored on computer, for configuring a computing device, in accord with embodiments. Visible in FIG. 1 are process actions 110, 120, 130, 140, and 150 and metric inputs 122 and 124. The process actions may include, as shown at 110, receiving a request for authorization for a subscriber purchase or expense. After receipt, as shown at 120, a real-time state of the subscriber may be determined along with the current value of the expense or purchase opportunity. The determination of the real-time state of the subscriber and the current value of the expense or purchase opportunity may be informed by real-time metrics 124 and expense/purchase value metrics. Upon making the determination of 120 an authorization outcome may be assigned, as shown at 130. This authorization outcome may be changed upon the evaluation of intervening overrides, as shown at 140 and, as shown at 150, a final authorization outcome may be assigned for the subscriber purchase and the final authorization may be communicated back to a requestor.

As noted herein, the authorization may be a partial authorization, a full authorization or a denial, and the process actions may be carried out over a network, on a server or cluster of servers accessible over the network. Real-time metrics of the proxy or subscriber can include the physiological condition of the subscriber; and previous transactional history under similar physiological conditions. The expense and purchase value metrics (which may also be called the expense and transaction value metrics) may include the short-term financial goals of the subscriber; long-term financial goals of the subscriber; macroeconomic outlook at the time of the transaction or expense; microeconomic outlook at the time of the transaction or expense; equity investment yields for the subscriber, e.g., last month, last quarter, last year, last 3 years and last 5 years; a subscriber's current immediate, short term, and long term liabilities, which may be available from debt statements, credit card companies, mortgage statements, student loans, etc.; a subscriber's current liquid cash, which may be available from banks, mutual funds, etc.; a subscriber's spending history; and a subscriber's prior decisions made by or for the subscriber under similar situations. Each the metrics measured or used can be adjusted through assignment of statistical or probabilistic weights. Another adjustment may come from an adjustment assigned to account for the value of the expenditure or transaction. For example, investment opportunities may be assigned weights greater than one while superfluous automobile purchases may be assigned values less than 0.5.

Additional inputs, to determine the value of the expenditure or transaction may also include the type of product/service, specific details of the product or service, e.g., SKU, the price of the product/service, possible or known benefits that are likely to accrue to the subscriber after buying this product, possible value, both tangible and intangible, which is likely to accrue to the subscriber after buying the product/service. Furthermore, each of these considerations may be further assigned statistical or probabilistic weights.

Figure 2:
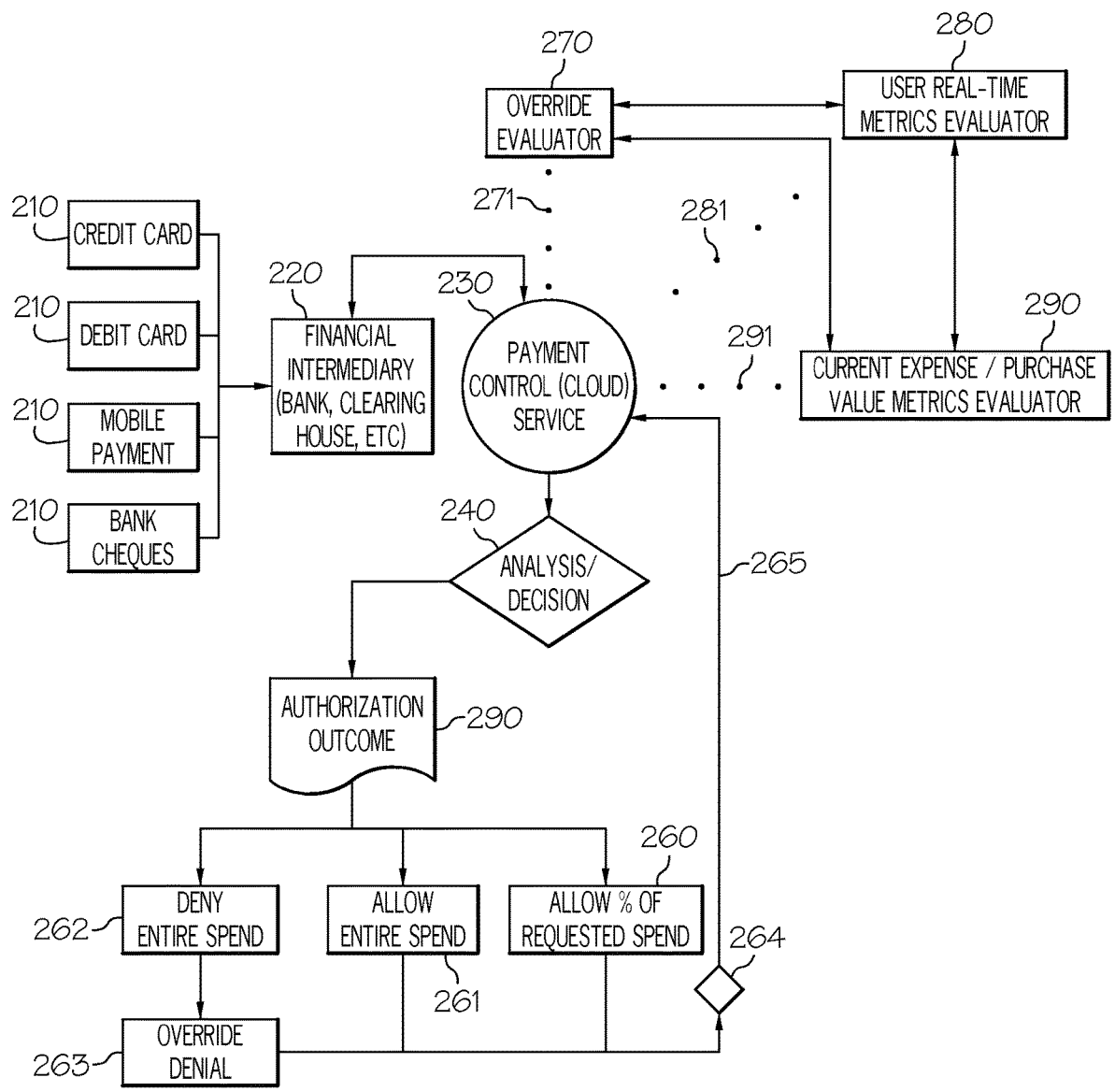
FIG. 2 shows components, and processes related thereto, for real-time regulation of personal expenditures and transactions, as may be employed in embodiments.

FIG. 2 provides components, and processes related thereto, for real-time regulation of personal expenditures and transactions, as may be employed in embodiments. Visible in FIG. 2 are financial intermediary 220, override evaluator 270, real-time metrics evaluator 280, current expense/purchase (or transaction) evaluator 290, and payment control (cloud) service evaluator 230. Each of these intermediaries and evaluators may be directly or indirectly (271, 281, and 291) connected and may work together to regulate, in real-time, personal expenditures and transaction of a subscriber or proxy. When a subscriber or proxy presents a payment vehicle 210 the applicable financial intermediary 220 may query a payment control service evaluator 230 to determine if the requested purchase meets the personal criteria of the subscriber. The payment control service 230 may gather information from the real-time metrics evaluator 280 and the expense/purchase value metrics evaluator and determine if an authorization should be provided, as shown at 290. If a denial is provided the payment control service may provide the details to the override evaluator 270 for further evaluation.

Other possible outcomes from the authorization outcome include an entire spend outcome 261 and a percentage allowed spend outcome 260. If the override is denied, as shown at 263, an additional test may be run and the PCS 230 may submit a denial or authorization to the financial intermediary. The additional test run at 264 may include delay test, additional queries, and other tests set by an administrator or subscriber for unique circumstances.

Figure 3:
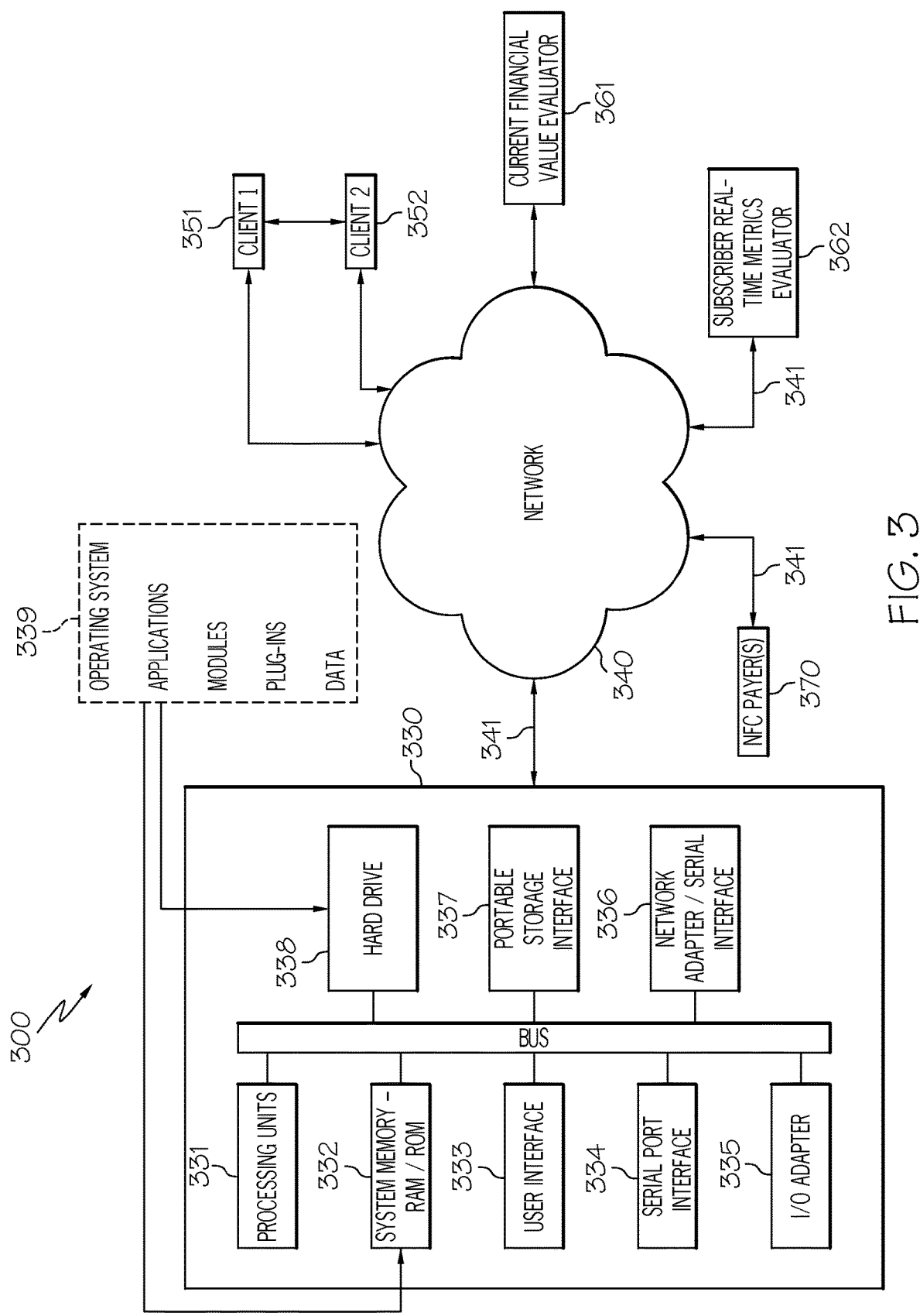
FIG. 3 shows system components as may be employed for real-time regulation of personal expenditures and transactions in embodiments.

FIG. 3 shows a system 300 as may be employed in embodiments. The PCS or evaluator or payment manager 330 shown in FIG. 3 includes one or more processing units 331, system memory 332, subscriber interfaces 333, serial port interfaces 334, I/O adapters 335, hard drives 338, portable storage interfaces 337, and network adapters 336. Each may be connected to and communicate over a bus. In operation, operational and applications, modules, plug-ins and data 339 may be stored on and retrieved from the memory 338 and 332 in order to be executed on and configure the processing units 331. These instructions and code may configure the processors to perform steps and actions consistent with those disclosed herein and to provide for real-time regulation of personal expenditures and transactions.

Also visible is the network 340, NFC payers 370, clients 351 and 352, current financial value evaluator 361 and subscriber real-time metrics evaluator 362. As can be seen these components and devices may communicate with each other directly and over the network 340 when performing processes consistent with embodiments of the invention.

Figure 4:
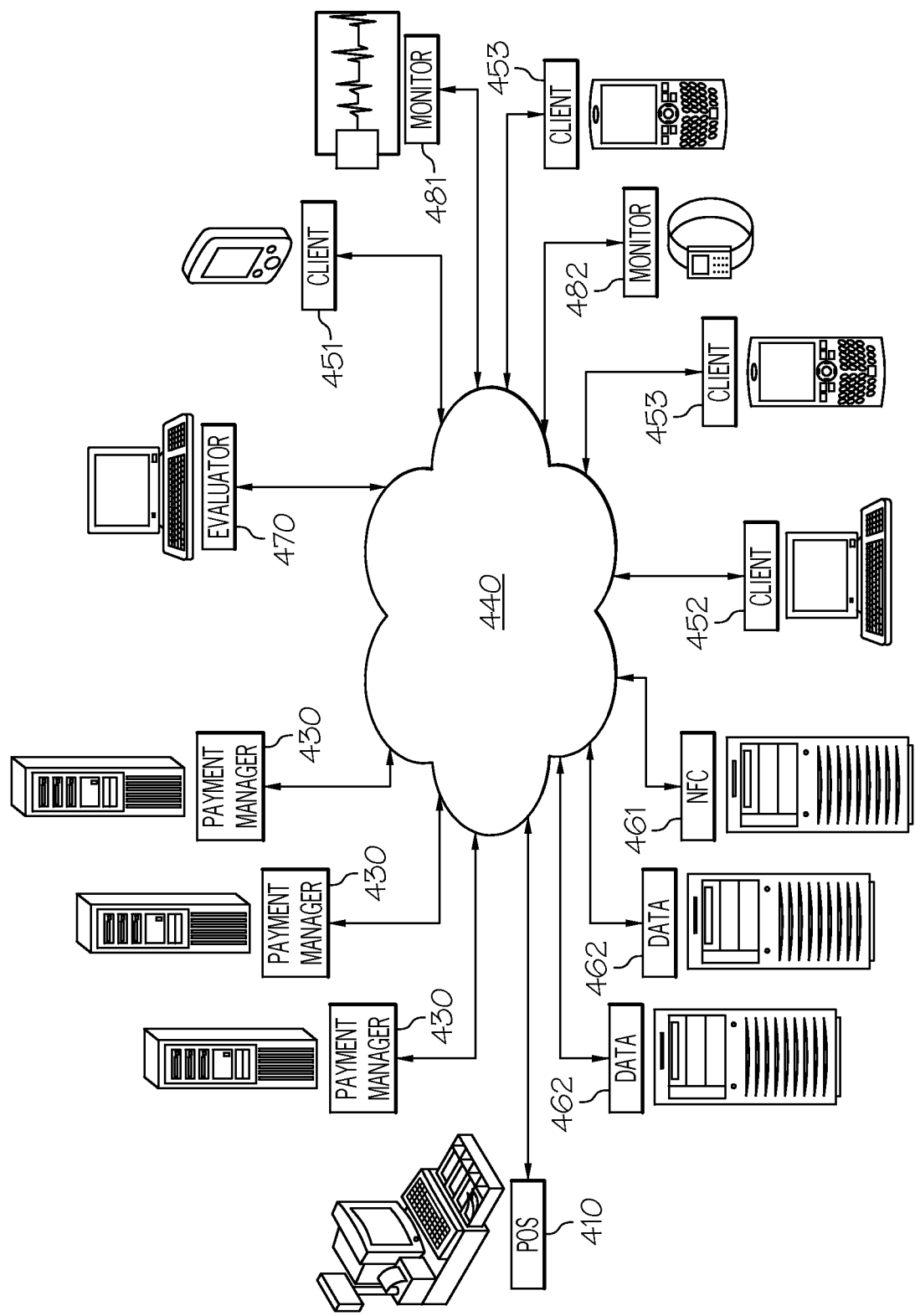
FIG. 4 shows system components as may be employed for real-time regulation of personal expenditures and transactions in embodiments.

FIG. 4 provides a schematic of a system consistent with embodiments of the invention. Visible in FIG. 4 are the point of sale system 410, a cluster of payment managers 430, an evaluator 470, client PDA 451, client mobile phone 453, heart monitor 481, biometrics monitor 482, client 452, NFC 461, data storage 462, and network 440. In embodiments, when a client is seeking to make an expenditure at or through a merchant's POS 410, an evaluator 470 and a payment manager 430 may be notified. This notification may include the details of the transaction, including its price, category, SKU, and vendor history. Upon receiving the notification the payment advisor 430 and or the evaluator 470 may query the databases 462 in order to receive additional information about the transaction or expense and the subscriber or subscriber to the service. This information can include historical data regarding the merchant, the SKU identified with the transaction, financial information of the subscriber, including status of accounts and assets and debts. A decision may be rendered by the evaluator or the payment manager may communicate with the POS of the merchant and the client. This communication may include the status of the authorization, a request for any needed additional information, an instruction regarding reevaluation and other pertinent information. If no authorization is provided instructions for reconsideration or submission of additional information may be provided. Likewise, if a partial authorization is provided, instructions for reconsideration or additional submissions may be provided.

As described throughout, status of the transaction or expenditure may be provided by the evaluator to the NFC or the payment manager before any financial transaction is begun or completed. In other words, before financial institutions, such as banks maintaining a credit card operation, are contacted to authorize the financial transaction, the subscriber's own personal clearance needs to be obtained from the evaluator. This clearance may be denied even though the subscriber's credit history is sufficient, and funds are available for the transaction because the evaluator has determined that other environmental metrics suggest that the transaction or expenditure is flawed, detrimental or somehow not recommended for the subscriber. If the query and evaluation were conducted at a different time, the metrics may be different, thereby resulting in a different result.

Example Number 1

A subscriber has a smart phone with NFC (Near Field Communication) capabilities that allows the smart phone to be used as a credit card. The consumer has $200 remaining in his or her bank account, a credit card debt of $4,000 and it is the 25th day of the month—with the next paycheck coming in on the 30th of the month. Here, in this example, when the subscriber enters a large apparel store, and attempts to buy a $100 shoe and offers his mobile NFC based credit card to the cashier, the application on the mobile device will interact with the cloud service evaluator and will receive a denial and the buying transaction will be prevented or cancelled before it is finished.

Example Number 2

A subscriber or proxy has a credit card and a smart phone that can capture real-time attributes like body temperature, palpitation, heart rate, pupil dilation, etc. The subscriber or proxy has $5,000 remaining in his or her bank account, a credit card debt of $0 and it is the 25th day of the month, with the next paycheck coming in on the 30th of the month At 11 am on a Saturday morning, the subscriber is currently in a state of hunger (having skipped breakfast) and attempts to buy an expensive perfume for $200 The cloud service will deny the credit card authorization based on the real-time emotional and physical metrics reported (as determined by the smart phone or other reporting sensors) and may suggest an alternative for a healthy meal at a local fast food outlet.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of any means or steps plus function elements in the claims are intended to include any structure, material or act for performing the function in combination with other claimed elements are specifically claimed. The description of the present invention has been presented throughout and herein for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A non-transitory computer readable medium containing instructions thereon, the instructions, which when executed by a computer comprising an evaluator sub-system, cause the computer to perform a real-time process comprising:
   receive, from a computing system of a financial intermediary, a request to evaluate a pending financial transaction for a subscriber;
   receive, by the evaluator sub-system, real-time measured physiological metrics of the subscriber from a physiological monitor configured to provide the real-time measured physiological metrics, wherein the real-time measured physiological metrics do not uniquely identify the subscriber, wherein the evaluator is configured to obtain access to the real-time measured physiological metrics when authorized by the subscriber, wherein the real-time measured physiological metrics are identified by pre-defined physiological metric thresholds associated with the subscriber:
   receive two or more financial metrics comprising a first financial metric related to the pending financial transaction and a second financial metric related to the subscriber;
   determining a first authorization status is authorized by evaluating the first financial metric and the second financial metric with respect to a financial goal of the subscriber; and
   responsive to the first authorization status being authorized, determining a second authorization status is not authorized by comparing the received real-time measured physiological metrics with the pre-defined physiological metric thresholds;
   determining that the pending financial transaction is not authorized based on the determinations that the first authorization status is authorized and that the second authorization status is not authorized;
   after said determining that the pending financial transaction is not authorized, receiving, by the evaluator sub-system, an updated real-time measured physiological metric of the subscriber;

changing the second authorization status from not authorized to authorized by comparing the updated real-time measured physiological metric with the pre-defined physiological metric thresholds; and in response to said changing, reporting an indication that the pending financial transaction is authorized to the computing system of a financial intermediary for preventing or allowing the pending financial transaction.

2. The non-transitory computer readable medium of claim 1 wherein the real-time measured physiological metrics includes quantified physical or emotional attributes of the subscriber.

3. The non-transitory computer readable medium of claim 1 wherein the second financial metric is one of a current financial information of the subscriber and a previously identified goal of the subscriber as previously identified by the subscriber.

4. The non-transitory computer readable medium of claim 1, wherein the first financial metric is macro-economic data.

5. The non-transitory computer readable medium of claim 1, wherein the request to evaluate the pending financial transaction further includes a request for authorization to finalize the pending financial transaction.

6. A server comprising an evaluator sub-system and a non-transitory computer readable medium containing instructions therein, the instructions, which when executed by the server, cause the server to perform a process comprising:

receive, from a computing system of a financial intermediary, a request to evaluate a pending financial transaction for a subscriber;

receive, by the evaluator sub-system, real-time measured physiological metrics of the subscriber from a physiological monitor configured to provide the real-time measured physiological metrics, wherein the real-time measured physiological metrics do not uniquely identify the subscriber, wherein the evaluator is configured to obtain access to the real-time measured physiological metrics when authorized by the subscriber, wherein the real-time measured physiological metrics are identified by pre-defined physiological metric thresholds associated with the subscriber:

receive two or more financial metrics comprising a first financial metric related to the pending financial transaction and a second financial metric related to the subscriber;

determining a first authorization status is authorized by evaluating the first financial metric and the second financial metric with respect to a financial goal of the subscriber; and responsive to the first authorization status being authorized, determining a second authorization status is not authorized by comparing the received real-time measured physiological metrics with the pre-defined physiological metric thresholds;

determining that the pending financial transaction is not authorized based on the determinations that the first authorization status is authorized and that the second authorization status is not authorized;

after said determining that the pending financial transaction is not authorized, receiving, by the evaluator sub-system, an updated real-time measured physiological metric of the subscriber;

changing the second authorization status from not authorized to authorized by comparing the updated real-time measured physiological metric with the pre-defined physiological metric thresholds; and in response to said changing, reporting an indication that the pending financial transaction is authorized to the computing system of a financial intermediary for preventing or allowing the pending financial transaction.

7. The server of claim 6 wherein the real-time measured physiological metrics includes quantified physical or emotional attributes of the subscriber.

8. The server of claim 6 wherein the second financial metric is one of a current financial information of the subscriber and a previously identified goal of the subscriber as previously identified by the subscriber.

9. The server of claim 6, wherein the first financial metric is macro-economic data.

10. The server of claim 6, wherein the request to evaluate the pending financial transaction further includes a request for authorization to finalize the pending financial transaction.

11. A system comprising an evaluator sub-system and a non-transitory computer readable medium containing instructions therein, the instructions, which when executed by the system, cause the system to perform a process comprising:

receive, from a computing system of a financial intermediary, a request to evaluate a pending financial transaction for a subscriber;

receive, by the evaluator sub-system, real-time measured physiological metrics of the subscriber from a physiological monitor configured to provide the real-time measured physiological metrics, wherein the real-time measured physiological metrics do not uniquely identify the subscriber, wherein the evaluator is configured to obtain access to the real-time measured physiological metrics when authorized by the subscriber, wherein the real-time measured physiological metrics are identified by pre-defined physiological metric thresholds associated with the subscriber:

receive two or more financial metrics comprising a first financial metric related to the pending financial transaction and a second financial metric related to the subscriber;

determining a first authorization status is authorized by evaluating the first financial metric and the second financial metric with respect to a financial goal of the subscriber; and responsive to the first authorization status being authorized, determining a second authorization status is not authorized by comparing the received real-time measured physiological metrics with the pre-defined physiological metric thresholds;

determining that the pending financial transaction is not authorized based on the determinations that the first authorization status is authorized and that the second authorization status is not authorized;

after said determining that the pending financial transaction is not authorized, receiving, by the evaluator sub-system, an updated real-time measured physiological metric of the subscriber;

changing the second authorization status from not authorized to authorized by comparing the updated real-time measured physiological metric with the pre-defined physiological metric thresholds; and in response to said changing, reporting an indication that the pending financial transaction is authorized to the computing system of a financial intermediary for preventing or allowing the pending financial transaction.

12. The system of claim 11 wherein the real-time measured physiological metrics includes quantified physical or emotional attributes of the subscriber.

13. The system of claim 11 wherein the second financial metric is one of a current financial information of the subscriber and a previously identified goal of the subscriber as previously identified by the subscriber.

14. The system of claim 11, wherein the first financial metric is macro-economic data.

15. The system of claim 11, wherein the request to evaluate the pending financial transaction further includes a request for authorization to finalize the pending financial transaction.

* * * * *